United States Patent [19]

Schwarz, Jr.

[11] Patent Number: 5,223,026

[45] Date of Patent: Jun. 29, 1993

[54] INK JET COMPOSITIONS AND PROCESSES

[75] Inventor: William M. Schwarz, Jr., Webster, N.Y.

[73] Assignee: Xerox Corporation, Stamford, Conn.

[21] Appl. No.: 738,024

[22] Filed: Jul. 30, 1991

[51] Int. Cl.$^5$ .............................................. C09D 11/02
[52] U.S. Cl. .............................. 106/20 D; 106/22 H; 346/1.1
[58] Field of Search ...................... 106/20, 22; 346/1.1

[56] References Cited

U.S. PATENT DOCUMENTS

| | | | |
|---|---|---|---|
| 3,994,736 | 11/1976 | Hertz et al. | 106/22 |
| 4,073,615 | 2/1978 | Lacroix et al. | 106/22 |
| 4,170,482 | 10/1979 | Mansukhani | 106/20 |
| 4,196,006 | 4/1980 | Mansukhani | 106/20 |
| 4,395,287 | 7/1983 | Kobayashi et al. | 106/20 |
| 4,597,794 | 7/1986 | Ohta et al. | 106/20 |
| 4,620,876 | 11/1986 | Fujii et al. | 106/20 |
| 4,705,567 | 11/1987 | Hair et al. | 106/20 |
| 4,793,264 | 12/1988 | Lin et al. | 106/22 |
| 4,849,770 | 7/1989 | Koike et al. | 346/1.1 |
| 4,990,186 | 2/1991 | Jones et al. | 106/20 |
| 5,006,172 | 4/1991 | Chleng et al. | 106/20 |
| 5,114,477 | 5/1992 | Mort et al. | 106/20 |
| 5,116,409 | 5/1992 | Moffatt | 106/20 |

FOREIGN PATENT DOCUMENTS

| | | |
|---|---|---|
| 008031 | 1/1976 | Japan . |
| 60-226575 | 11/1985 | Japan . |
| 63-297477 | 12/1988 | Japan . |
| 1158083 | 6/1989 | Japan . |

OTHER PUBLICATIONS

Dialog Abstract of JP03/234775, Oct. 18, 1991.

*Primary Examiner*—Mark L. Bell
*Assistant Examiner*—Helene Klemanski
*Attorney, Agent, or Firm*—Judith L. Byorick

[57] ABSTRACT

Disclosed is a thermal ink jet printing process which comprises incorporating into a thermal ink jet printing apparatus an ink composition comprising a colorant and a liquid vehicle which comprises a mixture of water and an organic component selected from the group consisting of: (1) cyclic amides; and mixtures thereof; and heating selected nozzles in the printing apparatus containing the ink, thereby causing droplets of the ink to be ejected in an imagewise pattern onto a substrate.

32 Claims, No Drawings

INK JET COMPOSITIONS AND PROCESSES

BACKGROUND OF THE INVENTION

The present invention relates to ink jet printing processes and ink compositions suitable for said processes. More specifically, the present invention is directed to ink jet printing processes employing specific ink compositions. One embodiment of the invention resides in a thermal ink jet printing process which comprises incorporating into a thermal ink jet printing apparatus an ink composition comprising a colorant and a liquid vehicle which comprises a mixture of water and an organic component selected from the group consisting of: (1) cyclic amides of the formula

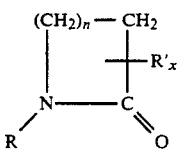

wherein n is a number of from 2 to about 12; R is hydrogen, alkyl or substituted alkyl with from 1 to about 6 carbon atoms, a polyethoxy group of the formula

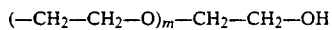

$(-CH_2-CH_2-O)_m-CH_2-CH_2-OH$ with m being a number of from 0 to about 9, or a polyimine group of the formula

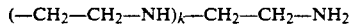

$(-CH_2-CH_2-NH)_k-CH_2-CH_2-NH_2$ with k being a number of from 0 to about 9; R' represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to $2n+2$; (2) a cyclic amide of the formula

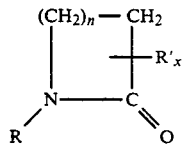

wherein n is a number of from 1 to about 12, R is a cyclohexyl group or a butyl group, and R' represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to $2n+2$; (3) cyclic esters of the formula

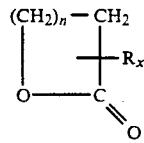

wherein n is a number of from 1 to about 12, R represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to $2n+2$; (4) amides of the formula

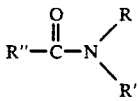

wherein R and R' are alkyl groups or substituted alkyl groups with from 2 to about 20 carbon atoms, polyethoxy groups of the formula

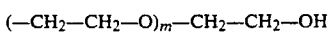

$(-CH_2-CH_2-O)_m-CH_2-CH_2-OH$ with m being a number of from 0 to about 9, or a polyimine group of the formula

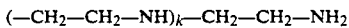

$(-CH_2-CH_2-NH)_k-CH_2-CH_2-NH_2$ with k being a number of from 0 to about 9, wherein R and R' can be bonded to each other to form a ring, and wherein R" is hydrogen or alkyl, with alkyl preferably having from 1 to about 20 carbon atoms; and mixtures thereof; and heating selected nozzles in the printing apparatus containing the ink, thereby causing droplets of the ink to be ejected in an imagewise pattern onto a substrate.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velcoity variation and directionality, thus impacting the system's ability to produce high quality copies. Drop-on-demand systems which use piezo electric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on open end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Known ink jet inks generally comprise a water soluble dye which is soluble in an ink vehicle such as water or a mixture comprising water and a water soluble or water miscible organic solvent. For example, U.S. Pat. No. 4,849,770 (Koike et al.) discloses an ink for use in an ink jet comprising a reactive dye or a reactive dispersing dye and a solvent composed mainly of water and an organic solvent which is not reactive with the dye. The ink is used in ink jet printing processes onto a cloth having fibers dyeable by a reactive dye, followed by a dye-fixing treatment. In addition, U.S. Pat. No. 4,793,264 (Lin et al.) discloses an ink for use with an ink jet system having material subject to corrosion by the ink, said ink comprising a fatty acid vehicle, a colorant, and amounts of anti-oxidant, preferably an alkylated hydroquinone, effective to reduce substantially the rate of corrosion on metallic parts of the system. Preferably the ink comprises an oleic acid vehicle and a vehicle additive selected from the group consisting of aromatic alcohols, aromatic ethers, dimethylsulfoxides, alkyl pyrrolidones, methoxy- and ethoxy- triglycols, aliphatic ketones, and mixtures thereof. Further Japanes Patent Publication 1-158083 discloses an ink composition for ink jet recording comprising 0.1 to 10 weight percent of a colorant, which can be either a dye or a pigment, 1 to 10 weight percent of a penetrating agent, and 25 to 09.9 weight percent of a polar solvent, such as formamide, DMSO, dimethyl ethanolamine, or N-methyl-2-pyrrolidone, having a viscosity of less than 6 mPas and a vapor pressure of less than 2 mm Hg at 20° C. In addition, U.S. Pat. No. 3,994,736 (Hertz et al.) discloses a pigment-free high intensity light fast ink suitable for ink jet printing which comprises a polar solvent liquid base and a premetallized azo dye. The ink may also contain an inorganic ionizable salt to impart electrical conductivity.

Heterophase ink jet inks are also known. For example, U.S. Pat. No. 4,705,567 (Hair et al.) discloses a heterophase ink jet ink composition which comprises water and a dye covalently attached to a component selected from the group consisting of poly(ethylene glycols) and poly(ethylene imines), which component is complexed with a heteropolyanion. In addition, U.S. Pat. No. 4,597,794 (Ohta et al.) discloses an ink jet recording process which comprises forming droplets of an ink and recording on an image receiving material by using the droplets, wherein the ink is prepared by dispersing fine particles of a pigment into an aqueous dispersion medium containing a polymer having both a hydrophilic and a hydrophobic construction portion. The hydrophilic portion constitutes a polymer of monomers having mainly polymerizable vinyl groups into which hydrophilic portions such as carboxylic acid groups, sulfonic acid groups, sulfate groups, and the like are introduced. Pigment particle size may be from several microns to several hundred microns. The ink compositions disclosed may also include additives such as surfactants, salts, resins, and dyes.

While known compositions and processes are suitable for their intended purposes, a need remains for ink compositions suitable for use in ink jet printers. In addition, a need remains for ink compositions with rapid drying times. A need also remains for ink compositions that exhibit long latency times in ink jet printers. Further, there is a need for ink compositions that produce sharp, non-feathering printed characters on plain paper. There is also a need for ink compositions that enable high print quality while also providing rapid drying times and/or long latency times in ink jet printers.

SUMMARY OF THE INVENTION

It is an object of the present invention to provide improved ink compositions.

It is another object of the present invention is to provide ink compositions suitable for use in ink jet printers.

It is yet another object of the present invention is to provide ink compositions with rapid drying times.

It is still another object of the present invention to provide ink compositions that exhibit long latency times in ink jet printers.

Another object of the present invention is to provide ink compositions that produce sharp, non-feathering printed characters on plain paper.

It is another object of the present invention to provide ink compositions that enable high print quality while also providing rapid drying times and/or long latency times in ink jet printers.

Yet another object of the present invention is to provide ink jet printing processes with inks exhibiting the above noted advantages.

Still another object of the present invention is to provide thermal ink jet printing processes using inks exhibiting the above noted advantages.

These and other objects of the present invention can be achieved by providing a thermal ink jet printing process which comprises incorporating into a thermal ink jet printing apparatus an ink composition comprising a colorant and a liquid vehicle which comprises a mixture of water and an organic component selected from the group consisting of (1) cyclic amides of the formula

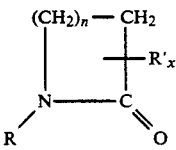

wherein n is a number of from 2 to about 12; R is hydrogen, alkyl or substituted alkyl with from 1 to about 6 carbon atoms, a polyethoxy group of the formula

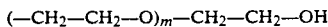

$(-CH_2-CH_2-O)_m-CH_2-CH_2-OH$ with m being a number of from 0 to about 9, or a polyimine group of the formula

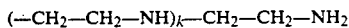

$(-CH_2-CH_2-NH)_k-CH_2-CH_2-NH_2$ with k being a number of from 0 to about 9; R' represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to $2n+2$; (2) cyclic esters of the formula

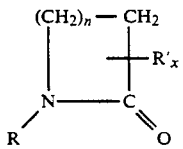

wherein n is a number of from 1 to about 12, R is a cyclohexyl group or a butyl group, and R' represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to $2n+2$; (3) cyclic esters of the formula

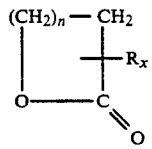

wherein n is a number of from 1 to about 12, R represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to $2n+2$; (4) amides of the formula

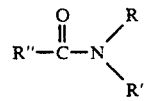

wherein R and R' are alkyl groups or substituted alkyl groups with from 2 to about 20 carbon atoms, polyethoxy groups of the formula

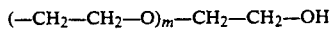

$(-CH_2-CH_2-O)_m-CH_2-CH_2-OH$ with m being a number of from 0 to about 9, or a polyimine group of the formula

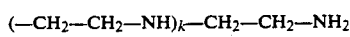

$(-CH_2-CH_2-NH)_k-CH_2-CH_2-NH_2$ with k being a number of from 0 to about 9, wherein R and R' can be bonded to each other to form a ring, and wherein R" is hydrogen or alkyl, with alkyl preferably having from 1 to about 20 carbon atoms; and mixtures thereof; and heating selected nozzles in the printing apparatus containing the ink, thereby causing droplets of the ink to be ejected in an imagewise pattern onto a substrate.

Inks employed in the printing process of the present invention contain a colorant. Generally, any effective dye, such as one of the direct dyes or the acid dyes, can be selected as the colorant, provided that it is compatible with the other ink components and is soluble in the liquid vehicle. Examples of suitable dyes include Bernacid Red 2BMN; Pontaimine Brilliant Bond Blue A; BASF X-34; Pontamine; Food Black 2; Carodirect Turquoise FBL Supra Conc. (Direct Blue 199), available from Caroline Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Alrich Chemical; Drimarene Brilliant Red X-2B (Reactive Red 56), available from Pylam, Inc.; Levafix Brilliant Red E-4B, available form Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF) ; Orasol Red G (Ciba-Geigy); Direct Brilliant Pink B (Crompton-Knolls); Aizen Spilon red C-BH (Hodagaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizeon Spilon Yellow C-GNH (Hodagaya Chemical Company); Sirius Supra Yellow GD 167;

Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI) Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 4G, available from Ciba-Geiby, Basilen Black P-BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen red E-7B, Basilen Red M-5B, Basilen blue E-r, Basilen Brilliant Blue P-3R, Basilen Black P-BR, Basilen Turquoise Blue P-GR, Basilen Turquoise M-2G, Basilen Turquoise E-G, and Basilen Green E-6B, available from BASF, Sumifix Turquoise Blue G, Sumifix Turquoise Blue H-GF, Sumifix Black B, Sumifix Black H-BG, Sumifix Yellow 2GC, Sumifix Supra Scalet 2GF, and Sumifix Brilliant Red 5BF, available from Sumitomo Chemical Company, Intracron Yellow C-8G, Intracron Red C-8B, Intracron Turquoise Blue GE, Intracron Turquoise HA, and Intracron Black RL, available from Crompton and Knowles, Dyes and Chemicals Division, and the like. The dye is present in the ink composition in any effective amount, generally from about 1 to about 15 percent by weight, and preferably from about 2 to about 7 percent by weight (these values refer to the concentration of dye molecules in the ink), although the amount can be outside of this range.

In addition, the colorant for the ink compositions of the present invention can be a pigment, or a mixture of one or more dyes and/or one or more pigments. The pigment can be black, cyan, magenta, yellow, red, blue, green, brown, mixtures thereof, and the like. Examples of suitable black pigments include various carbon blacks such as channel black, furnace black, lamp black and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as Cl 60710, Cl Dispersed Red 15, a diazo dye identified in the Color Index as Cl 26050, Cl Solvent Red 19, and the like. Illustrative examples of suitable cyan pigments include copper tetra-4-(octadecyl sulfonamido) phthalocyanine, X-copper phthalocyanine pigment, listed in the Color Index as Cl 74160, Cl Pigment Blue, and Anthradanthrene Blue, identified in the Color Index as Cl 69810, Special Blue X-2137, and the like. Illustrative examples of yellow pigments that can be selected include diarylide yellow 3,3-dichlorobenzidene acetoacetanilides, a monazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normany Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L700020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada, E. D. Toluidine Red (Aldrich), Lithol Rubien Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen red 3871K (BASF), Paliogen Red 3340 (BASF), and Lithol Fast Scarlet L4300 (BASF). Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 0.1 micron, and more preferably from about 0.001 to about 0.01 microns, although the diameter can be outside of this range. The pigment is present in the ink composition in any effective amount, generally from about 1 to about 7 percent by weight and preferably from about 2 to about 5 percent by weight, although the amount can be outside of this range.

The ink compositions of the present invention contain a liquid vehicle which comprises a mixture of water and an organic component. One group of suitable organic components includes cyclic amides of the formula

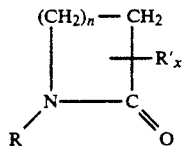

wherein n is a number of from 2 to about 12; R is hydrogen, alkyl or substituted alkyl with from 1 to about 6 carbon atoms, a polyethoxy group of the formula $$(-CH_2-CH_2-O)_m-CH_2-CH_2-OH$$

with m being a number of from 0 to about 9, or a polyimine group of the formula (—CH$_2$—CH$_2$—NH)$_k$—CH$_2$—CH$_2$—NH$_2$ with k being a number of from 0 to about 9; R' represents one or more substituents that can replace hydrogen in any of the hydrocarbon portions of the molecule, and is an alkyl group (typically with from 1 to about 12 carbon atoms), a halogen atom, a sulfate group, a nitro group, a sulfone group, an amide group, or an acetyl group, wherein x is a number of from 0 to 2n+2; (2) a cyclic amide of the formula

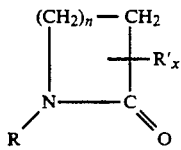

wherein n is a number of from 1 to about 12, R is a cyclohexyl group or a butyl group, and R' represents one or more substituents that can replace hydrogen in any of the hydrocarbon portions of the molecule, and is an alkyl group (typically with from 1 to about 12 carbon atoms), a halogen atom, a sulfate group, a nitro group, a sulfone group, an amide group, or an acetyl group, wherein x is a number of from 0 to 2n+2;

Specific examples of cyclic amides include methyl caprolactam, of the formula

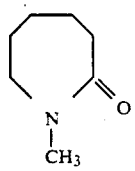

ε-caprolactam, of the formula

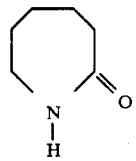

2-azacyclooctanone, of the formula

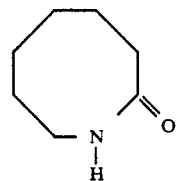

and the like. Compounds of these formulas are known, and are generally commercially available, such as cyclohexyl pyrrolidone, available from GAF, Wayne, N.J., ε-caprolactam, methyl caprolactam, 2-azacyclooctanone (8-membered ring), 2-azacyclononanone (9-membered ring), and 2-azacyclotridecanone (13-membered ring), available from Aldrich Chemical Company, Milwaukee, Wis., and the like. Cyclic amides of this formulas are also available from BASF.

Another group of suitable organic components comprises cyclic esters of the formula

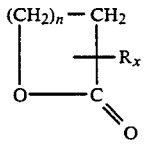

wherein n is a number of from 1 to about 12, R represents one or more substituents that can replace hydrogen in any of the hydrocarbon portions of the molecule, and is an alkyl group (typically with from 1 to about 12 carbon atoms), a halogen atom, a sulfate group, a nitro group, a sulfone group, an amide group, or an acetyl group, wherein x is a number of from 0 to 2n+2

Specific examples of cyclic esters include butyrolactone, of the formula

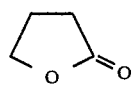

ε-caprolactone, of the formula

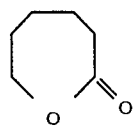

and the like. Compounds of the formulas are known, and are generally commercially available, such as butyrolactone and ε-caprolactone, available from Eastman Kodak Company, Rochester, N.Y. or Aldrich Chemical Company, Milwaukee, Wis.

Another group of suitable organic components comprises amides of the formula

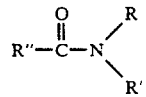

wherein R and R' are alkyl groups or substituted alkyl groups with from 2 to about 20 carbon atoms, ethoxy groups of the formula (—CH$_2$—CH$_2$—O)$_m$—CH$_2$—CH$_2$—OH with m being a number of from 0 to about 9, or a amino groups of the formula (—CH$_2$—CH$_2$—NH)$_k$—CH$_2$—CH$_2$—NH$_2$H with k being a number of from 0 to about 9, wherein R and R' can be bonded to each other to form a ring, wherein R can also be hydrogen and wherein R" is hydrogen or methyl. The amides suitable for the present invention can also have one or more substituents, such as alkyl groups (typically with from 1 to about 12 carbon atoms), halogen atoms, sulfate groups, nitro groups, sulfone groups, amide groups, acetyl groups or the like.

Specific examples of formamides include formylethanolamine, of the formula

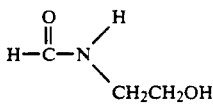

acetylethanolamine, of the formula

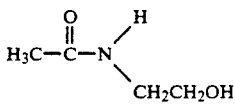

formylmorpholine, of the formula

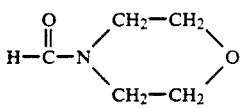

formylpiperidine, of the formula

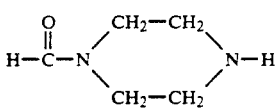

and the like. Compounds of these formulas are known, and are generally commercially available, such as acetylethanolamine, formylmorpholine, and formylpiperidine, available from Aldrich Chemical Company, Milwaukee, Wis. In addition, compounds such as formylethanolamine can be prepared by mixing ethyl formate and monoethanolamine together in approximately a 1 to 1 molar ratio and heating the mixture to about 80° C. to boil off the ethanol generated by the reaction, thus driving the reaction forward, as shown:

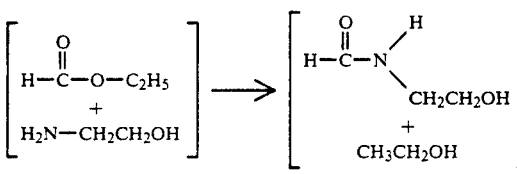

Similar compounds can be prepared from other alkyl formates, such as propyl formate, butyl formate, and the like, and other alkanol amines, such as propanolamine, butanolamine, and the like.

The materials selected for the organic component of the liquid vehicle are hygroscopic liquids or solids. Typically, many of the cyclic amides are solid at room temperature (typically from about 15° to about 35° C.), such as the caprolactams, the azooctanones, and the like. The hygroscopic nature of these solids renders them readily soluble in water when the liquid vehicle of the ink is prepared.

The liquid vehicle of the inks employed for the present invention can contain water and the organic component in any effective amounts. Generally, the liquid vehicle comprises water in an amount of from about 50 to about 99.5 percent by weight, preferably from about 80 to about 99 percent by weight, and the organic component in an amount of from about 0.5 to about 50 percent by weight, preferably from about 1 to about 30 percent by weight, although the relative amounts of water and organic component can be outside of these ranges.

Other additives can also be present in the inks of the present invention. For example, when pigment particles are employed as the colorant, the colloidal stability of the pigment particles can be enhanced by the addition of one or more surfactants or wetting agents to the ink. Surfactants can also enhance the drying times of both pigmented and dyed inks. These additives may be of the cationic, anionic, or nonionic types. Suitable surfactants and wetting agents include Tamol ® SN, Tamol ® LG, those of the Triton ® series available from Rohm and Haas Company, those of the Marasperse ® series, those of the Igepal ® series available from GAF Company, those of the Tergitol ® series, and other commercially available surfactants. Other suitable surfactants include aliphatic sulfates, aromatic sulfonates, amine oxides, alkanol amides, and the like. These surfactants and wetting agents are present in effective amounts, generally from about 0.001 to about 5 percent by weight, and preferably from about 0.01 to about 0.5 percent by weight, although the amount can be outside this range. The surfactants or wetting agents coat or adsorb onto the surfaces of the pigment particles to create electrically charged species, and also provide steric hindrance that separates the pigment particles, thereby enabling a stable colloidal dispersion.

Polymeric additives can also be added to the inks of the present invention to enhance the viscosity of the ink and the stability of pigment particles and to reduce the rate of agglomeration and precipitation of the particles. Water soluble polymers such as Gum Arabic, polyacrylate salts, polymethacrylate salts, polyvinyl alcohols, hydroxy propylcellulose, hydroxyethylcellulose, polyvinylpyrrolidinnone, polyvinylether, starch, polysaccharides, and the like are particularly useful for stabilizing pigment particles in a water based liquid vehicle such as water or a mixture of water and a water miscible organic liquid. Polymeric stabilizers may be present in the ink of the present invention in any effective amount, generally from 0 to about 10 percent by weight, and preferably from 0 to about 5 percent by weight, although the amount can be outside of this range.

Other optional additives to the inks prepared by the process of the present invention include biocides such as Dowicil 150, 200, and 75, benzoate salts, sorbate salts, and the like, present in an amount of from 0 to about 4 percent by weight, and preferably from about 0.01 to about 2.0 percent by weight, although the amount can be outside of this range, humectants such as ethylene glycol, diethyleneglycol, N-methylpyrrolidinone, propylene glycol, hydroxyethers, ethers, amides, sulfoxides, ketones, lactones, esters, alcohols, and the like, present in an amount of from 0 to about 50 percent by weight, and preferably from 0 to about 40 percent by weight, although the amount can be outside of this range, pH controlling agents such as acids or bases, phosphate salts, carboxylates salts, sulfite salts, amine salts, and the like, present in an amount of from 0 to about 1 percent by weight and preferably from 0 to about 1 percent by weight, although the amount can be outside of this range, or the like.

In addition, the ink compositions of the present invention can contain one or more drying agents. Preferred drying agents are materials that exhibit moderate to strong hydrogen bonding. Examples of drying agents include sodium lauryl sulfate, such as Lomar D, available from E.I. Du Pont de Nemours & Company, Wilmington, Del., or Daxad 19K, available from W.R. Grace Company, Lexington, Mass., sodium isoproyl naphthalene sulfonate, sulfones, such as dimethyl sulfone and the like, diamides, such as urea, 2-imidazolidone, and the like, amines, such as ethanolamine, piperazine, 2-pyrrolidone, dimethylurea, imidazole, pyrazole, 1,2,4-triazole, methyl isourea, diamino-2-propanol, diethanolamine, and the like, pseudoamines, such as 3-hydroxypyridine, 2-hydroxypyridine, and the like, acids, such as acetic acid and the like, inorganic bases, such as sodium hydroxide, potassium hydroxide, lithium hydroxide, calcium hydroxide, magnesium hydroxide, ammonium hydroxide, and the like, and any other suitable hydrogen bonding material, such as 2-hydroxyethyl pyridine, N-formlypiperazine, tetrazole, 2-methylimidazole, methylpyrazole, or the like. Particularly preferred drying agents are pyrazole and methylpyrazole, particularly 3-methyl pyrazole, as they are small, simple, thermally stable molecules hat are not affected by pH over the range of 6 to 8. Additional examples of drying agents include N-coco alkyl-2,2'-iminobis ethanol N-oxide, available as Armox C/12 from Akzo Chemie, Chicago, Ill., monoethanol amide, available as Ninol 1301 from Stepan Chemical Company, Northfield, Ill., lauramide diethanol amine, available as Ninol 70-SL from Stepan Chemical Company, Northfield, Ill., lauramide diethanol amine, available as Ninol 96-SL from Stepan Chemical Company, Northfield, Ill., coco alkyldimethylamines oxide (30 percent solution in isopropanol), available as Armox DMC from Akzo Chemie, Chicago, Ill., cocoamidopropylamine oxide (30 percent solution in isopropanol), available as Ammonyx CDO from Stepan Chemical Company, Northfield, Ill., lauramide oxide (40 percent solution in isopropanol), available as Ammonyx DMCD-40 from Stepan Chemical Company, Northfield, Ill., sodium dioctyl sulfosuccinate, available as Aerosol TO-100 from American Cyanamid Company, Wayne, N.J., isopropyl amine (branched) dodecyl benzene sulfonate, available as Polystep A-11 from Stepan Chemical Company, Northfield, Ill., amine alkyl benzene sulfonate (branched), available as Ninate 411 from Stepan Chemical Company, Northfield, Ill., and the like. The drying agent can be present in any effective amount. Typical amounts for the drying agent are from about 0.001 to about 5 percent by weight, and preferably from about 0.01 to about 0.5 percent by weight, although the amount can be outside of this range.

Ink compositions of the present invention can be prepared by various methods, including simple mixing of the ingredients under ambient conditions and in the relative amounts desired in the ink. When the colorant is a pigment instead of a dye, one suitable ink preparation process entails mixing the selected pigment with water and, optionally, a wetting agent such as those of the Daxad ® series of W.R. Grace (Daxad ® 19, 19K, 11, 11Kls, and the like, those of the Lomar ® series, including Lomar ® D, Lomar ® W, and the like, those of the Igepal series, such as Igepal ® CO 540, Co-560, and the like, those of the Tamol ® series, such as Tamol SN and the like, those of the Triton ® series, such as Triton 100 and the like, or organic liquids such as glycol derivatives, including ethylene glycol, diethylene glycol, polyethylene glycol, polypropylene glycol, and the like, or organic liquids such as glycol derivatives, including ethylene glycol, diethylene glycol, polyethylene glycol, polypropylene glycol, and the like, with the wetting agent, if present, in the mixture in an amount of from about 0.1 to about 50 percent by weight to wet the pigment in the aqueous medium. Wetting enables the pigment to break apart to form a homogeneous aqueous dispersion. This mixture is then attrited, for example by placing it in a ball mill. The attrition can be performed in air or under an inert atmosphere. Attrition generally continues for a period of from about 0.25 to about 48 hours, which results in reduction of the pigment particle size to a desirable range of from about 0.0010 to about 20 microns in average particle diameter. Subsequent to attrition, the resulting dispersion of pigment particles can be subjected to filtration and/or centrifugation to remove undesirably large particles, and the dispersion can then be mixed with the organic component and any other desired ingredients to form an ink. Alternatively, the organic component and any other desired ingredients can be present in the dispersion of pigment particles prior to attrition, and subsequent to attrition and any desired filtration or centrifugation steps, the desired ink is obtained.

The present invention is also directed to a printing process which comprises applying an ink according to the present invention to a substrate in imagewise fashion. In a specific embodiment, the present invention includes a process which comprises incorporating into an ink jet printing apparatus an ink composition according to the present invention and causing droplets of the ink to be ejected in an imagewise pattern onto a substrate, thereby generating images on the substrate. The ink compositions of the present invention can be used to form images on a wide variety of substrates, including plain papers such as Xerox ® 4024 papers, Xerox ® 4200 papers, Xerox ® 10 series papers, canary ruled paper, ruled notebook paper, bond paper such as Gilber 25 percent cotton bond paper, Gilber 100 percent cotton bond paper, and Strathmore bond paper, silica coated papers such as Sharp Company silica coated paper, JuJo paper, and the like, transparency materials such as Xerox ® 3R3351, Tetronix ink jet transparencies, Arkright ink jet transparencies, and the like, fabrics, textile products, plastics, polymeric films, inorganic substrates such as metals and wood, and the like.

Inks of the present invention exhibit characteristics that make them highly desirable for printing process, particularly thermal ink jet printing processes. For example, the surface tension of inks of the present invention generally ranges from about 30 to about 65 dynes per centimeter, and preferably is as high as possible, preferably being from about 40 to about 65 dynes per centimeter and more preferably about 65 dynes per centimeter. Viscosity generally ranges from about 1.0 to about 5.0 centipoise and preferably ranges from 1 to 3 centipoise. Latency, which is the period during which the ink jet may be stopped while it contains the ink and subsequently restarted without clogging of the nozzle, is generally about 100 seconds, and frequently extends beyond 1000 seconds. Latency in general should be as high as possible, and at least 50 seconds, to enable restarting of the ink jet printer after extended idle periods. Prints made with the inks of the present invention generally exhibit image edge sharpness and reduced feathering on plain paper as well as treated or coated papers and transparencies. In addition, prints made from the inks of the present invention exhibit improved drying times, with the drying times on plain paper being as little as one second or less in some instances.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Four ink compositions were prepared as follows. A concentrated aqueous dispersion of carbon black particles was prepared by adding to a Union Process attritor containing 1,500 grams of ⅛ inch diameter steel shots 176.5 grams of distilled water. To 50 additional grams of distilled water was added 13.5 grams of Lomar D (dispersing agent, a condensate of formaldehyde and sodium naphthalene sulfonate, obtained from E.I. Du Pont de Nemours & Company, Wilmington, Del.). To the water in the attritor was then added 23 grams of the mixture of water and dispersing agent, and the attritor contents were mixed. Subsequently, 60 grams of Raven® 5250 carbon black (obtained from Columbian Specialty Chemicals Company, Atlanta, Ga.) was added to the attritor and the mixture was stirred until the carbon black was uniformly dispersed. Thereafter, the remaining 40.5 grams of the mixture of water and dispersing agent were added to the attritor while mixing was continued. After addition was complete, the attritor contents were attrited for 30 minutes, followed by removal of the dispersion by pipette to dryness. The inside of the attritor and the steel shots were then rinsed with 25 grams of distilled water and the water was added to the dispersion collected from the attritor. The rinsing process was repeated with another 25 grams of water, resulting a total recovery of 330 grams of dispersion from the attritor (94.39 percent yield, containing 17.14 percent by weight of carbon black solids). Samples of this carbon black dispersion were then mixed with water and various organic components to result in inks with the following compositions:

A.

5 percent by weight of carbon black
1 percent by weight of Lomar D
15 percent by weight of methylcaprolactam (obtained from Aldrich Chemical Company, Milwaukee, Wis.)
79 percent by weight of water

B.

5 percent by weight of carbon black
1 percent by weight of Lomar D
10 percent by weight of caprolactam (obtained from Aldrich Chemical Company, Milwaukee, Wis.)
84 percent by weight of water

C.

5 percent by weight of carbon black
1 percent by weight of Lomar D
15 percent by weight of 2-azacyclooctanone (obtained from Aldrich Chemical Company, Milwaukee, Wis.)
79 percent by weight of water

D.

5 percent by weight of carbon black
1 percent by weight of Lomar D
15 percent by weight of caprolactone (obtained from Aldrich Chemical Company, Milwaukee, Wis.)
79 percent by weight of water The inks were incorporated into a thermal ink jet test fixture equipped with a 48 jet printhead with a resolution of 288 spi and operated at 33.5 V with a pulse length of 3 microseconds to generate 100 drops per second. The inks were jetted under 15 percent relative humidity conditions and at 25° C., with air of the specified relative humidity and temperature being blown onto the surface of the printhead during jetting. Latency times were measured by jetting the inks at 100 drops per second, ceasing the jetting process for a given number of seconds, subsequently again applying voltage, and determining whether ink was jetted after the "latent" period. Latency times in seconds for inks A through D were as follows:

| Ink | First Drop Latency (sec.) | Drop #10 Latency (sec.) |
|-----|---------------------------|--------------------------|
| A   | 75                        | >1,000                   |
| B   | 75                        | >1,000                   |
| C   | 50                        | >1,000                   |
| D   | 50                        | 200                      |

The data for first drop latency were measured by allowing the printhead containing the ink to remain idle for the indicated time period, followed by jetting a single drop of ink; these times represent the amount of time that the printhead could remain idle followed by successful jetting of the first drop of ink from the printhead. The data for drop #10 latency were measured by allowing the printhead containing the ink to remain idle for the indicated time period, followed by jetting 10 drops of ink; these times represent the amount of time that the printhead could remain idle followed by successful jetting of the tenth drop of ink from the printhead. A typical maintenance procedure for printheads containing ink that have remained idle for a period of time is to jet 10 drops from each nozzle; when firing 10 drops from the nozzle fails to restore normal operation, a hard stop failure has occurred. As the data indicate, the inks of the present invention were able to remain in an idle printhead for periods of from 50 to 75 seconds, followed by successful jetting of the first drop fired from the nozzle. The inks of the present invention were also able to remain in an idle printhead for periods of from 200 to over 1,000 seconds, followed by successful jetting of the tenth drop fired from the nozzle. The high latency period of these inks indicates that printheads containing these inks would require very little maintenance to restore normal operations after extended idle periods.

EXAMPLE II

An ink composition was prepared by mixing together by stirring a sample of the carbon black dispersion prepared in Example I with distilled water, an organic component, and a drying agent to result in an ink with the following composition:

E.

5 percent by weight of carbon black
1 percent by weight of Lomar D
25 percent by weight of 2-azacyclooctanone (obtained from Aldrich Chemical Company, Milwaukee, Wis.)
2 percent by weight of 3-methyl pyrazole (drying agent, obtained from Aldrich Chemical Company, Milwaukee, Wis.)
67 percent by weight of water Ink E as well as inks A and D from Example I were subjected to an extended latency test by incorporating each ink into the printing test fixture of Example I and determining the number of drop ejection attempts required to restore normal jetting functioning after extended idle periods. The number of drops required to restore normal functioning under the indicated conditions were as follows:

| Ink | Quiescent Condition | Drop # |
|---|---|---|
| A | 1 hour at 20% relative humidity | 5 |
| A | 19 hours at 20% relative humidity | 16 |
| D | 10 minutes at 20% relative humidity | 190 |
| E | 19 hours at 18% relative humidity | 350 |

As the data indicate, inks of the present invention enabled normal jetting function to be restored even after idle periods of 19 hours. In contrast, typical ink compositions containing carbon black pigment particles result in complete clogging of the jetting nozzles after as little as 1 hour, after which normal jetting functions cannot be restored.

EXAMPLE III

Ink compositions were prepared as follows. Samples of the carbon black dispersion prepared in Example I were mixed with water and organic components (solids in this instance) in varying amounts to produce ink compositions containing 6 percent by weight of carbon black and the amount of organic component shown in the table below, with the balance of the composition being water. A control sample was also prepared containing 6 percent by weight of carbon black and 94 percent by weight of water. Each ink was hand coated onto the wire (porous) and felt (sized) sides of Xerox ® '100' Series Smooth paper using a #8 Meyer rod for solid areas and a simple ruling pen for lines. The dry time for each ink was determined by noting the time required for the coating to show negligible smearing when abraded with a Q-tip ®. Drying times for inks containing the indicated organic components in the indicated amounts were as follows: As the data indicate, the organic components, which as shown in Examples I and II improve latency times, in many instances also improved drying times. The drying times also frequently appeared to improve (decrease) with increasing organic component concentration, which is in contrast to other commonly used ink jet organic components such as ethylene glycol,

| Organic Component and Concentration (percent by weight) | Drying Time Felt Side (seconds) | Drying Time Wire Side (seconds) |
|---|---|---|
| Control (no organic component) | 22 | 16 |
| methyl caprolactam - 5% | 19 | 15 |
| methyl caprolactam - 10% | 22 | 13 |
| methyl caprolactam - 20% | 29 | 12 |
| 2-azacyclooctanone - 10% | 24 | 18 |
| 2-azacyclooctanone - 15% | 26 | 17 |
| 2-azacyclooctanone - 20% | 28 | 16 |
| 2-azacyclooctanone - 25% | 26 | 15 | for which drying is retarded as concentration increases. In addition, the ratio of dry times on the felt and wire sides at a given concentration is also of interest, since the closer this ratio is to unity the less variability in dry time would be expected over a range of sized and porous papers. In this instance, 10 percent of 2-azacyclooctanone exhibited outstanding performance with a ratio of 1:1.3.

EXAMPLE IV

Ink compositions were prepared as follows. A concentrated aqueous dispersion of carbon black particles was prepared by adding to a Union Process attritor containing 1,500 grams of ⅛ inch diameter steel shots 175 grams of distilled water. To 50 additional grams of distilled water was added 15 grams of Daxad 19k (dispersing agent, a condensate of formaldehyde and sodium naphthalene sulfonate, obtained from W.R. Grace & Company). To the water in the attritor was then added 23 grams of the mixture of water and dispersing agent, and the attritor contents were mixed. Subsequently, 60 grams of Raven ® 5250 carbon black (obtained from Columbian Specialty Chemicals Company, Atlanta, Ga.) was added to the attritor and the mixture was stirred until the carbon black was uniformly dispersed. Thereafter, the remaining 42 grams of the mixture of water and dispersing agent were added to the attritor while mixing was continued. After addition was complete, the attritor contents were attrited for 30 minutes, followed by removal of the dispersion by pipette to dryness. The inside of the attritor and the steel shots were then rinsed with 25 grams of distilled water and the water was added to the dispersion collected from the attritor. The rinsing process was repeated with another 25 grams of water, which was also added to the dispersion collected from the attritor. Samples of the carbon black dispersion thus produced were then mixed with water and various organic components to result in inks with the following compositions:

F.

6 percent by weight of carbon black
1.5 percent by weight of Daxad 19k
10 percent by weight of methyl caprolactam
5 percent by weight of 3-methyl pyrazole
77.5 percent by weight of water

G.

6 percent by weight of carbon black
1.5 percent by weight of Daxad 19k
10 percent by weight of methyl caprolactam
8 percent by weight of 3-methyl pyrazole
74.5 percent by weight of water

H.

6 percent by weight of carbon black
1.5 percent by weight of Daxad 19k
10 percent by weight of methyl caprolactam
5 percent by weight of pyrazole
77.5 percent by weight of water

I.

6 percent by weight of carbon black
1.5 percent by weight of Daxad 19k
10 percent by weight of methyl caprolactam
7.5 percent by weight of cyclohexyl pyrrolidone
75 percent by weight of water

J.

6 percent by weight of carbon black
1.5 percent by weight of Daxad 19k
20 percent by weight of methyl caprolactam
10 percent by weight of pyrazole
62.5 percent by weight of water

K.

6 percent by weight of carbon black
1.5 percent by weight of Daxad 19k
20 percent by weight of methyl caprolactam
5 percent by weight of pyrazole
67.5 percent by weight of water

L.

6 percent by weight of carbon black
1.5 percent by weight of Daxad 19k
20 percent by weight of methyl caprolactam
5 percent by weight of 3-methyl pyrazole
67.5 percent by weight of water

M.

6 percent by weight of carbon black
1.5 percent by weight of Daxad 19k
20 percent by weight of methyl caprolactam
4 percent by weight of cyclohexyl-2-pyrrolidone
68.5 percent by weight of water

N.

6 percent by weight of carbon black
1.5 percent by weight of Daxad 19k
20 percent by weight of methyl caprolactam
2 percent by weight of (AR) Ammonyx CDO (surfactant, obtained from Stepan Chemical Company, Northfield, Ill.)
70.5 percent by weight of water

O.

6 percent by weight of carbon black
1.5 percent by weight of Daxad 19k
20 percent by weight of methyl caprolactam
0.3 percent by weight of sodium lauryl sulfate
72.2 percent by weight of water

P.

6 percent by weight of carbon black
1.5 percent by weight of Daxad 19k
10 percent by weight of methyl caprolactam
10 percent by weight of pyrazole
72.5 percent by weight of water

Q.

6 percent by weight of carbon black
1.5 percent by weight of Daxad 19k
10 percent by weight of 2-azacyclooctanone
5 percent by weight of pyrazole
77.5 percent by weight of water

R.

6 percent by weight of carbon black
1.5 percent by weight of Daxad 19k
10 percent by weight of 2-azacyclooctanone
3 percent by weight of 3-methyl pyrazole
79.5 percent by weight of water

S.

6 percent by weight of carbon black
1.5 percent by weight of Daxad 19k
10 percent by weight of butyrolactone
5 percent by weight of pyrazole
77.5 percent by weight of water

T.

6 percent by weight of carbon black
1.5 percent by weight of Daxad 19k
10 percent by weight of caprolactone
5 percent by weight of pyrazole
77.5 percent by weight of water

U.

6 percent by weight of carbon black
1.5 percent by weight of Daxad 19k
5 percent by weight of formyl ethanol amine
5 percent by weight of acetyl ethanol amine
5 percent by weight of pyrazole
77.5 percent by weight of water

V.

6 percent by weight of carbon black
1.5 percent by weight of Daxad 19k
15 percent by weight of formyl ethanol amine
5 percent by weight of pyrazole
72.5 percent by weight of water

W.

6 percent by weight of carbon black
1.5 percent by weight of Daxad 19k
15 percent by weight of formyl morpholine
10 percent by weight of pyrazole
67.5 percent by weight of water These ink compositions were incorporated into a thermal ink jet test fixture equipped with a 48 jet printhead with a resolution of 288 spi and operated at 33.5 V with a pulse length of 3 microseconds to generate 100 drops per second. The inks were jetted at 25° C., with air of the specified relative humidity and temperature being blown onto the surface of the printhead during jetting. Latency times were measured by jetting the inks at 100 drops per second, ceasing the jetting process for a given number of seconds, subsequently again applying voltage, and determining whether ink was jetted after the "latent" period. The dry time for each ink was determined by noting the time required for the coating to show negligible smearing when abraded with a Q-tip ®. Latency times and dry times in seconds for inks F through W were as follows:

| Ink | % RH | Latency (sec.) #1 Drop | Latency (sec.) #10 Drop | FMAX (KHz) | Solid Area Dry Time Wire | Solid Area Dry Time Felt | Text Area Dry Time Wire | Text Area Dry Time Felt |
|---|---|---|---|---|---|---|---|---|
| F |    | 40     | 500    | 3.1 | 7  | 16 | <3 | 8  |
| G | 24 | 50     | <200   | 3.0 | 6  | 9  | <3 | 4  |
| H |    | 100    | >500   | 4.2 | 9  | 17 | 6  | 8  |
| I | 57 | 75     | >1,000 | 3.6 | 13 | 17 | 6  | 8  |
| J | 39 | 40     | 500    | 2.4 | 6  | 15 | <3 | 8  |
| K | 42 | >1,000 | >1,000 | 3.0 | 9  | 21 | <4 | 7  |
| L | 23 | 40     | 500    | 2.4 | 9  | 17 | <4 | 6  |
| M | 39 | 75     | >1,000 | 2.4 | 13 | 20 | <4 | 13 |
| N | 23 | 75     | >100   | 2.4 | 9  | 23 | 6  | 11 |
| O | 24 | >1,000 | >1,000 | 3.0 | <6 | 18 | <3 | 9  |

-continued

| Ink | % RH | Latency (sec.) #1 Drop | Latency (sec.) #10 Drop | FMAX (KHz) | Solid Area Dry Time Wire | Solid Area Dry Time Felt | Text Area Dry Time Wire | Text Area Dry Time Felt |
|---|---|---|---|---|---|---|---|---|
| P | 62 | — | — | 3.0 | 11 | 22 | 6 | 9 |
| Q | 35 | 75 | <200 | 3.8 | 15 | 19 | 6 | 9 |
| R | — | — | — | — | 10 | 17 | 4 | 7 |
| S | — | 20 | 30 | 5.5 | 16 | 17 | 6 | 6 |
| T | — | 30 | 50 | — | 14 | 18 | 8 | 9 |
| U | — | 30 | 75 | — | 21 | 25 | 9 | 11 |
| V | — | 20 | 50 | — | 18 | 26 | 8 | 10 |
| W | — | 20 | 50 | 4.8 | 19 | 29 | 8 | 17 |

(— indicates that the value was not measured)

As the data indicate, inks of the present invention enable excellent drying times, latency times, or both. The improved drying times enable the use of these inks in printing apparatuses without smearing of the images formed as the printed sheets pass through the machine and are stacked in an output tray. The improved latency times enable restarting of the printer and restoration of normal jetting operations after periods of idleness.

EXAMPLE V

Ink compositions were prepared by mixing portions of a carbon black dispersion prepared as described in Example I with water, methylcaprolactam, and a drying agent to result in inks of the following compositions:

X.

5 percent by weight of carbon black
20 percent by weight of methylcaprolactam (obtained from Aldrich Chemical Company, Milwaukee, Wis.)
2 percent by weight of pyrazole (obtained from Aldrich Chemical Company, Milwaukee, Wis.)
73 percent by weight of water

Y.

5 percent by weight of carbon black
20 percent by weight of methylcaprolactam (obtained from Aldrich Chemical Company, Milwaukee, Wis.)
5 percent by weight of pyrazole (obtained from Aldrich Chemical Company, Milwaukee, Wis.)
70 percent by weight of water

Z.

5 percent by weight of carbon black
20 percent by weight of methylcaprolactam (obtained from Aldrich Chemical Company, Milwaukee, Wis.)
10 percent by weight of pyrazole (obtained from Aldrich Chemical Company, Milwaukee, Wis.)
65 percent by weight of water

AA.

5 percent by weight of carbon black
20 percent by weight of methylcaprolactam (obtained from Aldrich Chemical Company, Milwaukee, Wis.)
2 percent by weight of n-cyclohexyl pyrrolidone (obtained from Aldrich Chemical Company, Milwaukee, Wis.)
73 percent by weight of water

BB.

5 percent by weight of carbon black
20 percent by weight of methylcaprolactam (obtained from Aldrich Chemical Company, Milwaukee, Wis.)
5 percent by weight of n-cyclohexyl pyrrolidone (obtained from Aldrich Chemical Company, Milwaukee, Wis.)
70 percent by weight of water

CC.

5 percent by weight of carbon black
20 percent by weight of methylcaprolactam (obtained from Aldrich Chemical Company, Milwaukee, Wis.)
7 percent by weight of n-cyclohexyl pyrrolidone (obtained from Aldrich Chemical Company, Milwaukee, Wis.)
68 percent by weight of water

DD.

5 percent by weight of carbon black
20 percent by weight of methylcaprolactam (obtained from Aldrich Chemical Company, Milwaukee, Wis.)
10 percent by weight of n-cyclohexyl pyrrolidone (obtained from Aldrich Chemical Company, Milwaukee, Wis.)
65 percent by weight of water

EE.

5 percent by weight of carbon black
20 percent by weight of methylcaprolactam (obtained from Aldrich Chemical Company, Milwaukee, Wis.)
2 percent by weight of cocoamidopropylamine oxide (Ammonyx CDO, obtained from Stepan Chemical Company, Chicago, Ill.)
73 percent by weight of water

FF.

5 percent by weight of carbon black
20 percent by weight of methylcaprolactam (obtained from Aldrich Chemical Company, Milwaukee, Wis.)
5 percent by weight of cocoamidopropylamine oxide (Ammonyx CDO, obtained from Stepan Chemical Company, Chicago, Ill.)
70 percent by weight of water

GG.

5 percent by weight of carbon black
20 percent by weight of methylcaprolactam (obtained from Aldrich Chemical Company, Milwaukee, Wis.)
10 percent by weight of cocoamidopropylamine oxide (Ammonyx CDO, obtained from Stepan Chemical Company, Chicago, Ill.)
65 percent by weight of water

HH.

5 percent by weight of carbon black
20 percent by weight of methylcaprolactam (obtained from Aldrich Chemical Company, Milwaukee, Wis.)

0.5 percent by weight of sodium lauryl sulfate (obtained from Fisher Scientific Company, Fair Lawn, N.J.)
74.5 percent by weight of water

II.

5 percent by weight of carbon black
20 percent by weight of methylcaprolactam (obtained from Aldrich Chemical Company, Milwaukee, Wis.)
1 percent by weight of sodium lauryl sulfate (obtained from Fisher Scientific Company, Fair Lawn, N.J.)
74 percent by weight of water

JJ.

5 percent by weight of carbon black
20 percent by weight of methylcaprolactam (obtained from Aldrich Chemical Company, Milwaukee, Wis.)
0.5 percent by weight of sodium lauryl sulfate (obtained from Fisher Scientific Company, Fair Lawn, N.J.)
70 percent by weight of water Each ink was hand coated onto the felt (sized) side of Xerox ® '10' Series Smooth paper using a #8 Meyer rod for solid areas. The dry time for each ink was determined by noting the time required for the coating to show negligible smearing when abraded with a Q-tip ®. Drying times for inks X through JJ were as follows:

| Ink | Drying Agent | Dry Time (sec.) |
|-----|--------------|-----------------|
| X | 2% by weight pyrazole | 19 |
| Y | 5% by weight pyrazole | 16 |
| Z | 10% by weight pyrazole | 12 |
| AA | 2% by weight n-cyclohexyl pyrrolidone | 13 |
| BB | 5% by weight n-cyclohexyl pyrrolidone | 10 |
| CC | 7% by weight n-cyclohexyl pyrrolidone | 6 |
| DD | 10% by weight n-cyclohexyl pyrrolidone | 2 |
| EE | 2% by weight Ammonyx COO | 12 |
| FF | 5% by weight Ammonyx COO | 2 |
| GG | 10% by weight Ammonyx COO | 0.5 |
| HH | 0.5% by weight sodium lauryl sulfate | 5 |
| II | 1% by weight sodium lauryl sulfate | 2 |
| JJ | 5% by weight sodium lauryl sulfate | 0.5 |

These data illustrate the additional improvements in drying times that can be obtained with inks of the present invention that contain added drying agents. The use of additional drying agents enables further control and "fine tuning" of the drying time for the ink composition.

Other embodiments and modifications of the present invention may occur to those skilled in the art subsequent to a review of the information presented herein; these embodiments and modifications, as well as equivalents thereof, are also included within the scope of this invention.

What is claimed is:

1. A thermal ink jet printing process which comprises incorporating into a thermal ink jet printing apparatus an ink composition comprising a colorant and a liquid vehicle which comprises a mixture of water and an organic component selected from the group consisting of: (1) cyclic amides of the formula

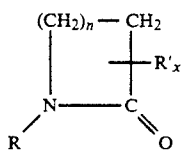

wherein n is a number of from 2 to about 12; R is hydrogen, alkyl or substituted alkyl with from 1 to about 6 carbon atoms, a polyethoxy group of the formula $(-CH_2-CH_2-O)_m-CH_2-CH_2-OH$ with m being a number of from 0 to about 9, or a polyimine group of the formula $(-CH_2-CH_2-NH)_k-CH_2-CH_2-NH_2$ with k being a number of from 0 to about 9; R' represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to 2n+2; (2) a cyclic amide of the formula

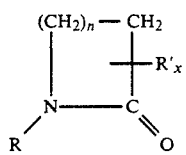

wherein n is a number of from 1 to about 12, R is a cyclohexyl group or a butyl group, and R' represents one or more substituents that can replace hydrogen in any of the hydrocarbon portions of the molecule, and is an alkyl group, a halogen atom, a sulfate group, a nitro group, a sulfone group, and amide group, or an acetyl group, wherein x is a number of from 0 to 2n+2; (3) cyclic esters of the formula

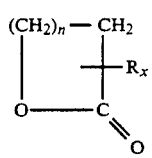

wherein n is a number of from 1 to about 12, R represents one or more substituents that can replace hydrogen in any of the hydrocarbon portions of the molecule, and is an allyl group, a halogen atom, a sulfate group, a nitro group, a sulfone group, an amide group, or an acetyl group, wherein x is a number of from 0 to 2n+2, wherein said cyclic ester is a solid at temperatures of up to about 35° C.; (4) amides of the formula

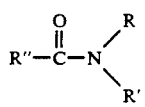

wherein R and R' are alkyl groups or substituted alkyl groups with from 2 to about 20 carbon atoms, polyethoxy groups of the formula

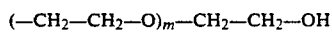

with m being a number of from 0 to about 9, or polyimine groups of the formula

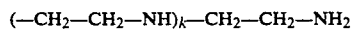

with k being a number of from 0 to about 9, wherein R and R' can be bonded to each other to from a ring, wherein R can also be hydrogen, and wherein R" is hydrogen or alkyl; and mixtures thereof; wherein the water is present in the liquid vehicle in an amount of at least about 50 percent by weight and the organic component is present in the liquid vehicle in an amount of no more than about 50 percent by weight; and heating selected nozzles in the printing apparatus containing the ink, thereby causing droplets of the ink to be ejected in an imagewise pattern onto a substrate.

2. A thermal ink jet printing process according to claim 1 wherein the organic component is a cyclic amide of the formula

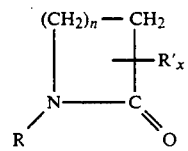

wherein n is a number of from 2 to about 12; R is hydrogen, alkyl or substituted alkyl with from 1 to about 6 carbon atoms, a polyethoxy group of the formula

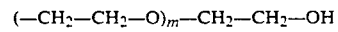

with m being a number of from 0 to about 9, or a polyimine group of the formula

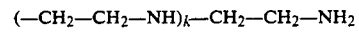

with k being a number of from 0 to about 9; R' represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to 2n+2.

3. A thermal ink jet printing process according to claim 2 wherein the cyclic amide is selected from the group consisting of caprolactam, methyl caprolactam, 2-azacyclooctanone, 2-azacyclononanone, 2-azacyclotridecanone, and mixtures thereof.

4. A thermal ink jet printing process which comprises incorporating into a thermal ink jet printing apparatus an ink composition comprising a colorant and a liquid vehicle which comprises a mixture of water and a cyclic amide organic component of the formula

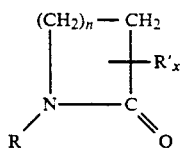

wherein n is a number from 2 to about 12, R is a butyl group, and R' represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to 2n+2; and heating selected nozzles in the printing apparatus containing the ink, thereby causing droplets of the ink to be ejected in an imagewise pattern onto a substrate.

5. A thermal ink jet printing process which comprises incorporating into a thermal ink jet printing apparatus an ink composition consisting essentially of a colorant and a liquid vehicle which consists essentially of a mixture of water, a cyclic ester of the formula

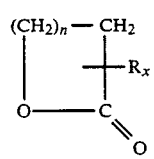

wherein n is a number from 2 to about 12, R represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to 2n+2, an optional drying agent, and an optional surfactant; and heating selected nozzles in the printing apparatus containing the ink, thereby causing droplets of the ink to be ejected in an imagewise pattern onto a substrate.

6. A thermal ink jet printing process according to claim 5 wherein the cyclic ester is selected from the group consisting of butyrolactone, caprolactone, and mixtures thereof.

7. A thermal ink jet printing process according to claim 1 wherein the organic component is an amide of the formula

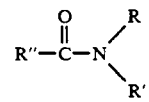

wherein R and R' are alkyl groups or substituted alkyl groups with from 2 to about 20 carbon atoms, polyethoxy groups of the formula

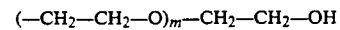

with m being a number of from 0 to about 9, or polyimine groups of the formula

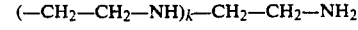

with k being a number of from 0 to about 9, R and R' can be bonded to each other to form a ring, wherein R can also be hydrogen, and wherein R" is hydrogen or alkyl.

8. A thermal ink jet printing process according to claim 7 wherein the amide is selected from the group consisting of formylethanolamine, acetylethanolamine, formylmorpholine, formylpiperidine, and mixtures thereof.

9. A thermal ink jet printing process according to claim 1 wherein the organic component is a cyclic amide of the formula

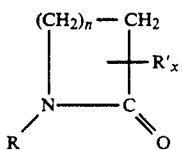

wherein n is a number from 1 to about 12, R is a cyclohexyl group, and R' represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to 2n+2.

10. A thermal ink jet printing process according to claim 9 wherein the organic component is cyclohexyl pyrrolidone.

11. A thermal ink jet printing process according to claim 1 wherein the liquid vehicle comprises water in an amount of from about 50 to about 99.5 percent by weight and the organic component in an amount of from about 0.5 to about 50 percent by weight.

12. A thermal ink jet printing process according to claim 1 wherein the liquid vehicle comprises water in an amount of from about 80 to about 99 percent by weight and the organic component in an amount of from about 1 to about 30 percent by weight.

13. A thermal ink jet printing process according to claim 1 wherein the colorant is a dye.

14. A thermal ink jet printing process according to claim 1 wherein the colorant is a pigment.

15. A thermal ink jet printing process according to claim 1 wherein the ink composition contains a surfactant.

16. A thermal ink jet printing process according to claim 15 wherein the surfactant is present in an amount of from about 0.001 to about 5 percent by weight.

17. A thermal ink jet printing process according to claim 1 wherein the ink composition contains a drying agent.

18. A thermal ink jet printing process according to claim 17 wherein the drying agent is present in an amount of from about 0.001 to about 5 percent by weight.

19. A thermal ink jet printing process according to claim 17 wherein the drying agent is present in an amount of from about 0.01 to about 0.5 percent by weight.

20. A thermal ink jet printing process according to claim 17 wherein the drying agent is selected from the group consisting of sodium lauryl sulfate, sodium isopropyl naphthalene sulfonate, sulfones, diamides, amines, pseudoamines, acids, inorganic bases, and mixtures thereof.

21. A thermal ink jet printing process according to claim 17 wherein the drying agent is selected from the group consisting of dimethyl sulfone, urea, 2-imidazolidone, ethanolamine, piperazine, 2-pyrrolidone, dimethylurea, imidazole, pyrazole, 1,2,4-triazole, methyl isourea, diamino-2-propanol, diethanolamine, 3-hydroxypyridine, 2-hydroxypyridine, acetic acid, sodium hydroxide, potassium hydroxide, lithium hydroxide, calcium hydroxide, magnesium hydroxide, ammonium hydroxide, 2-hydroxyethyl pyridine, N-formylpiperazine, tetrazole, 2-methylimidazole, methylpyrazole, N-coco alkyl-2,2'-iminobis ethanol N-oxide, monoethanol amide, lauramide diethanol amine, coco alkyldimethylamines oxide, cocoamidopropylamine oxide, lauramide oxide, sodium dioctyl sulfosuccinate, isopropyl amine dodecyl benzene sulfonate, amine alkyl benzene sulfonate, and mixtures thereof.

22. A thermal ink jet printing process which comprises incorporating into a thermal ink jet printing apparatus an ink composition comprising a colorant and a liquid vehicle which comprises a mixture of water and an organic component selected from the group consisting of: (1) cyclic amides of the formula

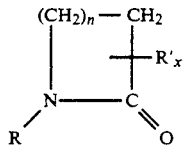

wherein n is a number of from 2 to about 12; R is hydrogen, alkyl or substituted alkyl with from 1 to about 6 carbon atoms, a polyethoxy group of the formula

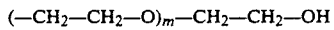

with m being a number of from 0 to about 9, or a polyimine group of the formula

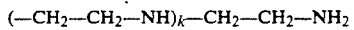

with k being a number of from 0 to about 9; R' represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to 2n+2; (2) a cyclic amide of the formula

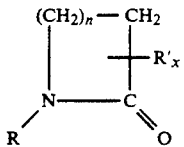

wherein n is a number of from 1 to about 12, R is a cyclohexyl group or a butyl group, and R' represents one or more substituents that can replace hydrogen in any of the hydrocarbon portions of the molecule, and is an alkyl group, a halogen atom, a sulfate group, a nitro group, a sulfone group, and amide group, or an acetyl group, wherein x is a number of from 0 to 2n+2; (3) cyclic esters of the formula

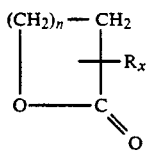

wherein n is a number of from 1 to about 12, R represents one or more substituents that can replace hydrogen in any of the hydrocarbon portions of the molecule, and is an allyl group, a halogen atom, a sulfate group, a nitro group, a sulfone group, an amide group, or an acetyl group, wherein x is a number of from 0 to 2n+2; (4) amides of the formula

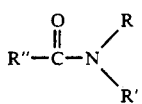

wherein R and R' are alkyl groups or substituted alkyl groups with from 2 to about 20 carbon atoms, polyethoxy groups of the formula

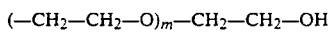

with m being a number of from 0 to about 9, or polyimine groups of the formula

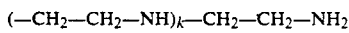

with k being a number of from 0 to about 9, wherein R and R' can be bonded to each other to from a ring, wherein R can also be hydrogen, and wherein R" is hydrogen or alkyl; and mixtures thereof, wherein the organic component is a solid at temperatures of up to about 35° C.; and heating selected nozzles in the printing apparatus containing the ink, thereby causing droplets of the ink to be ejected in an imagewise pattern onto a substrate.

23. An ink composition comprising a colorant and a liquid vehicle which comprises a mixture of water and an organic component comprising a cyclic amide of the formula

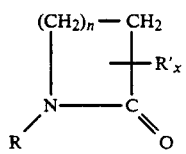

wherein n is a number of from 2 to about 12; R is hydrogen, alkyl or substituted alkyl with from 1 to about 6 carbon atoms, a polyethoxy group of the formula

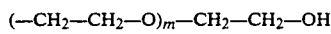

with m being a number of from 0 to about 9, or a polyimine group of the formula

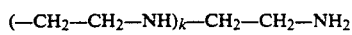

with k being a number of from 0 to about 9; R' represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to 2n+2.

24. An ink composition according to claim 23 wherein the cyclic amide is selected from the group consisting of caprolactam, methyl caprolactam, 2-azacyclooctanone, 2-azacyclononanone, 2-azacyclotridecanone, and mixtures thereof.

25. An ink composition comprising a colorant and a liquid vehicle which comprises a mixture of water and an organic component comprising a cyclic ester of the formula

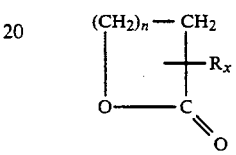

wherein n is a number from 2 to about 12, R represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to 2n+2, wherein said cyclic ester is a solid at temperatures of up to about 35° C.

26. An ink composition comprising a colorant and a liquid vehicle which comprises a mixture of water and an organic component comprising a cyclic amide of the formula

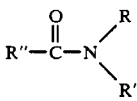

wherein R and R' are alkyl groups or substituted alkyl groups with from 2 to about 20 carbon atoms, polyethoxy groups of the formula

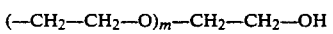

with m being a number of from 0 to about 9, and with R and R' being bonded to each other to form a ring, or polyimine groups of the formula

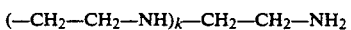

with k being a number of from 0 to about 9; wherein R and R' can be bonded to each other to form a ring, wherein R can also be hydrogen, and wherein R" is hydrogen or alkyl, wherein the water is present in the liquid vehicle in an amount of at least about 50 percent by weight and the organic component is present in the liquid vehicle in an amount of no more than about 50 percent by weight.

27. An ink composition according to claim 26 wherein the amide is selected from the group consisting of formylmorpholine, formylpiperidine, and mixtures thereof.

28. An ink composition comprising a colorant and a liquid vehicle which comprises a mixture of water and an organic component comprising a cyclic amide of the formula

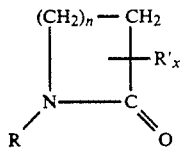

wherein n is a number of from 1 to about 12, R is a cyclohexyl group, and R' represents one or more substituents that can replace hydrogen in any of the hydrocarbon portions of the molecule, and is an alkyl group, a halogen atom, a sulfate group, a nitro group, a sulfone group, an amide group, or an acetyl group, wherein x is a number of from 0 to 2n+2, wherein the water is present in the liquid vehicle in an amount of at least about 50 percent by weight and the organic component is present in the liquid vehicle in an amount of no more than about 50 percent by weight.

29. An ink composition according to claim 28 wherein the organic component is cyclohexylpyrrolidone.

30. A thermal ink jet printing process according to claim 1 wherein the organic component is an amide of the formula

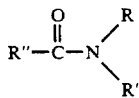

wherein R and R' are alkyl groups or substituted alkyl groups with from 2 to about 20 carbon atoms, polyethoxy groups of the formula

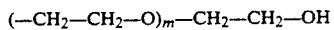

with m being a number of from 0 to about 9 and with R and R' being bonded to each other to form a ring, or polyimine groups of the formula

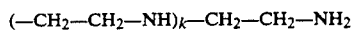

with k being a number of from 0 to about 9, wherein R and R' can be bonded to each other to form a ring, wherein R can also be hydrogen, and wherein R" is hydrogen or alkyl.

31. A thermal ink jet printing process according to claim 30 wherein the amide is selected from the group consisting of formylmorpholine, formylpiperidine, and mixtures thereof.

32. A thermal ink jet printing process according to claim 1 wherein the substrate is paper.

* * * * *